US006798736B1

(12) United States Patent
Black et al.

(10) Patent No.: US 6,798,736 B1
(45) Date of Patent: Sep. 28, 2004

(54) METHOD AND APPARATUS FOR TRANSMITTING AND RECEIVING VARIABLE RATE DATA

(75) Inventors: Peter J. Black, La Jolla, CA (US); Gadi Karmi, San Diego, CA (US); Nagabhushana T. Sindhushayana, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/158,254

(22) Filed: Sep. 22, 1998

(51) Int. Cl.⁷ .............................................. H04J 11/00
(52) U.S. Cl. .................................... 370/208; 370/342
(58) Field of Search ............................... 370/209, 468, 370/208, 335, 342; 375/130, 140, 145, 149, 225

(56) References Cited

U.S. PATENT DOCUMENTS

| | | | |
|---|---|---|---|
| 4,901,307 A | 2/1990 | Gilhousen et al. | 370/18 |
| 5,103,459 A | 4/1992 | Gilhousen et al. | 371/1 |
| 5,289,476 A | 2/1994 | Johnson et al. | 371/37.1 |
| 5,353,352 A * | 10/1994 | Dent et al. | 380/37 |
| 5,414,796 A | 5/1995 | Jacobs et al. | 395/2.3 |
| 5,446,747 A | 8/1995 | Berrou | 371/45 |
| 5,506,865 A | 4/1996 | Weaver, Jr. | 375/205 |
| 5,566,206 A | 10/1996 | Butler et al. | 375/225 |
| 5,583,884 A * | 12/1996 | Maruyama et al. | 374/107 |
| 5,757,813 A | 5/1998 | Raith | 371/5.5 |
| 5,930,230 A * | 7/1999 | Odenwalder et al. | 370/208 |
| 6,147,964 A * | 11/2000 | Black et al. | 370/209 |
| 6,307,867 B1 * | 10/2001 | Roobol et al. | 370/342 |
| 6,317,413 B1 * | 11/2001 | Honkasalo | 370/209 |
| 6,353,626 B1 * | 3/2002 | Sunay et al. | 370/335 |
| 6,359,877 B1 * | 3/2002 | Rathonyi et al. | 370/232 |
| 6,363,058 B1 * | 3/2002 | Roobol et al. | 370/310 |
| 6,370,134 B1 * | 4/2002 | Aramaki | 370/320 |

FOREIGN PATENT DOCUMENTS

| | | | |
|---|---|---|---|
| WO | 9503652 | 2/1995 | H04B/7/26 |
| WO | 9508888 | 3/1995 | H04L/25/02 |

OTHER PUBLICATIONS

"Orthogonal Multi–Spreading Factor Forward Link for Coherent DS–CDMA Mobile Radio", Okawa et al., IEEE, Dec. 10, 1997, pp. 618–622.

* cited by examiner

Primary Examiner—Chi Pham
Assistant Examiner—Keith M. George
(74) Attorney, Agent, or Firm—Philip Wadsworth; Sandra L. Godsey; Brian S. Edmonton

(57) ABSTRACT

A variable rate transmission system transmits a variable rate data packet including an accompanying rate indication signal indicative of the transmission rate of the variable data packet. The data packet can be spread using a long pseudonoise (PN) code, the mask of which can be selected in accordance with the transmission rate of the variable rate data packet. A preamble, providing the transmission rate, can be punctured into an outgoing pilot signal. The rate indication signal can be encoded in accordance with a set of orthogonal functions that are part of the indication of the transmission rate of the data packet.

13 Claims, 11 Drawing Sheets

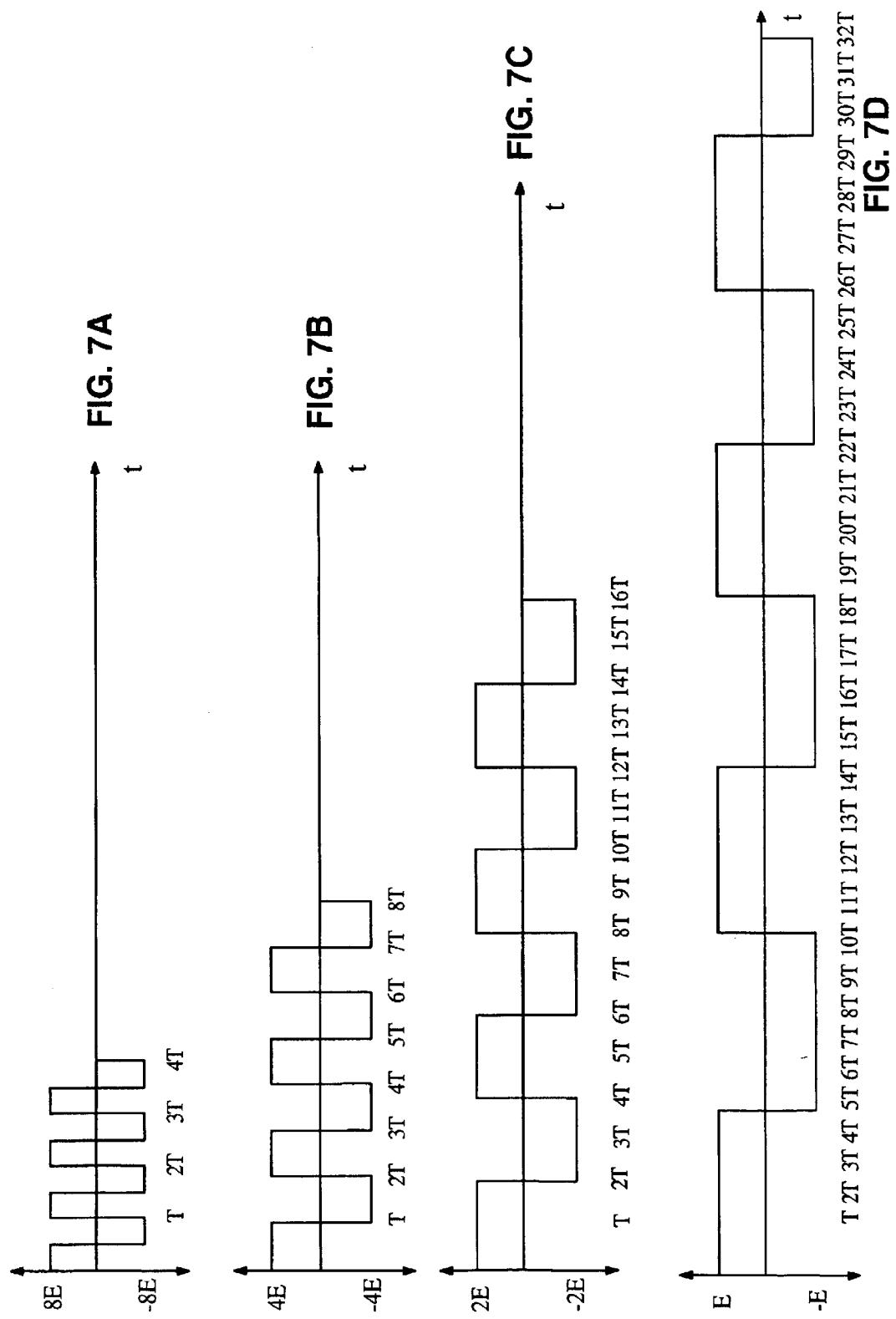

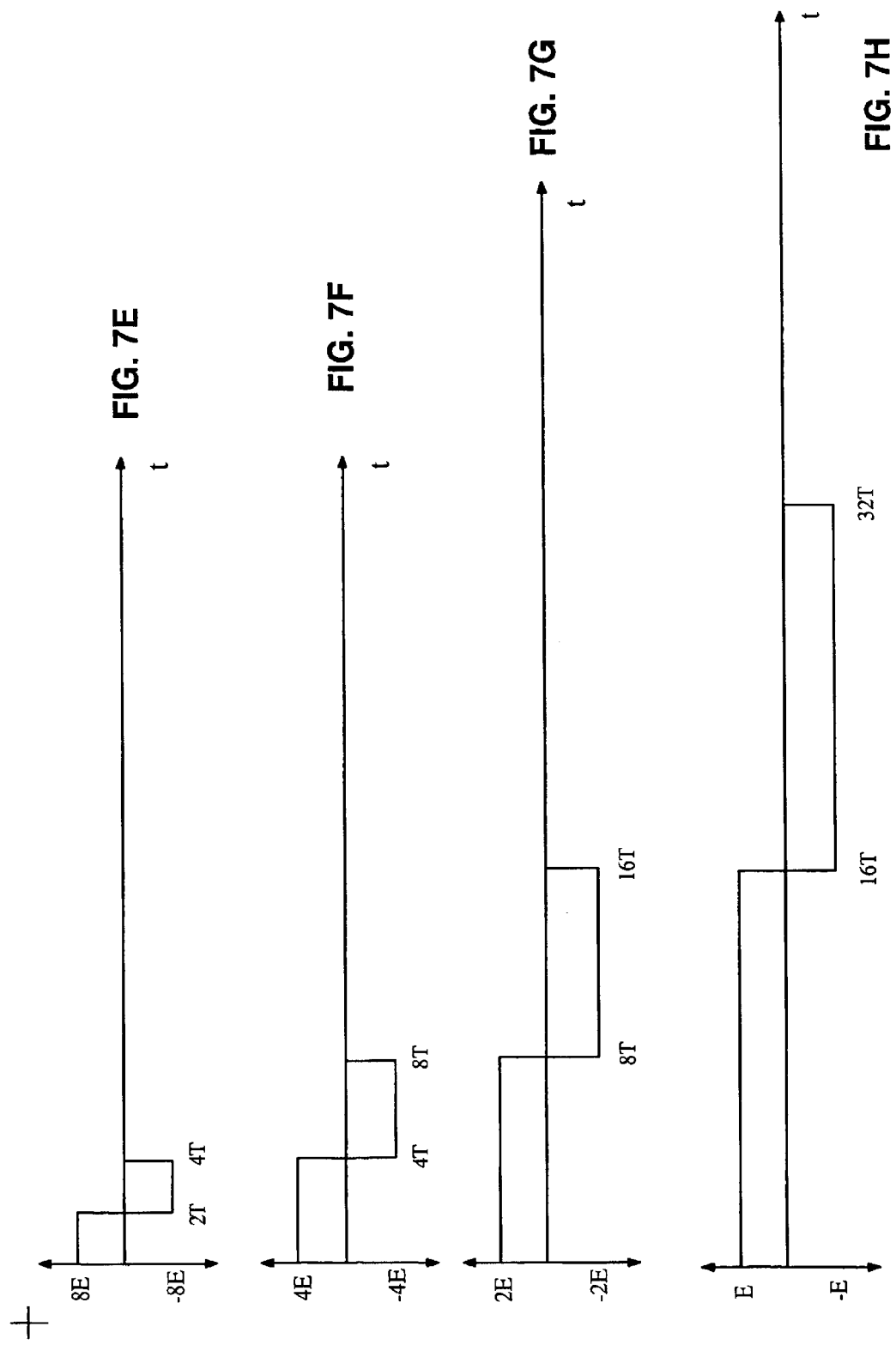

METHOD AND APPARATUS FOR TRANSMITTING AND RECEIVING VARIABLE RATE DATA

BACKGROUND OF THE INVENTION

I. Field of the Invention

The present invention relates to communications. More particularly, the present invention relates to a method and apparatus for transmitting and receiving variable rate packets of data with signals indicative of the data rate of those packets.

II. Description of the Related Art

The use of code division multiple access (CDMA) modulation techniques is one of several techniques for facilitating communications in which a large number of system users are present. Although other techniques such as time division multiple access (TDMA), frequency division multiple access (FDMA), and AM modulation schemes such as amplitude companded single sideband (ACSSB) are known, CDMA has significant advantages over these other techniques. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and assigned to the assignee of the present invention and incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM," assigned to the assignee of the present invention and incorporated by reference herein.

In the aforementioned U.S. Pat. No. 5,103,459 (the '459 patent), the use of orthogonal Walsh codes to provide channelization to different subscriber stations is described. This allows a base station to transmit many separate channels to a plurality of users in the coverage area of the base station. In the '459 patent, one of the orthogonal Walsh channels that was transmitted was a pilot channel that allowed for the coherent demodulation of the traffic channels transmitted on other orthogonal Walsh channels. A method for transmitting a CDMA signal from a mobile station which is capable of coherent demodulation is described in U.S. patent application Ser. No. 08/856,428, now abandoned, entitled "REDUCED PEAK TO AVERAGE TRANSMIT POWER HIGH DATA RATE IN A CDMA WIRELESS COMMUNICATION SYSTEM," filed May 14, 1997, assigned to the assignee of the present invention and incorporated by reference herein. In U.S. patent application Ser. No. 08/856,428, the mobile station transmits a plurality of different channels wherein each of the channels is distinguished by use of a short Walsh sequence. In addition, U.S. patent application Ser. No. 08/856,428 describes a method of complex pseudonoise (PN) spreading that reduces peak to average ratio in the transmission of a QPSK modulated signal.

CDMA systems often employ a variable rate vocoder to encode data so that the data rate can be varied from one data frame to another. An exemplary embodiment of a variable rate vocoder is described in U.S. Pat. No. 5,414,796, entitled "VARIABLE RATE VOCODER," assigned to the assignee of the present invention and incorporated by reference herein. The use of a variable rate communications channel reduces mutual interference by eliminating unnecessary transmissions when there is no useful speech to be transmitted.

Similarly, it is desirable for providing variable rate transmission of digital data in CDMA wireless communication systems. When there is a great deal of digital information to be transmitted and when minimizing delay is important, then data should be transmitted at high transmission rates. However, when there is less data to be transmitted or when minimizing delay is not as important, it is desirable to reduce the transmission rate of digital data in a wireless communication system, because transmission at rates lower than the maximum transmission rate can result in increased range, extended battery life and reduce interference to other users.

One technique for the receiver to determine the rate of a received data frame is described in U.S. Pat. No. 5,566,206, entitled "METHOD AND APPARATUS FOR DETERMINING DATA RATE OF TRANSMITTED VARIABLE RATE DATA IN A COMMUNICATIONS RECEIVER," assigned to the assignee of the present invention and incorporated by reference herein. Another technique is described in U.S. patent application Ser. No. 08/126,477, entitled "MULTI-RATE SERIAL VITERBI DECODER A FOR CODE DIVISION MULTIPLE ACCESS SYSTEM APPLICATIONS," filed Sep. 24, 1993, now U.S. Pat. No. 5,710,784, issued Jan. 20, 1998 to Kindred et al., assigned to the assignee of the present invention, and incorporated by reference herein. According to these techniques, each received data frame is decoded at each of the possible rates. Error metrics, which describe the quality of the decoded symbols for each frame decoded at each rate, are provided to a processor. The error metrics may include Cyclic Redundancy Check (CRC) results, Yamamoto Quality Metrics, and Symbol Error Rates. These error metrics are well-known in communications systems. The processor analyzes the error metrics and determines the most probable rate at which the incoming symbols were transmitted.

SUMMARY OF THE INVENTION

The present invention provides a novel and improved apparatus and method for transmitting and receiving variable rate data. In the first embodiment of the present invention, the data is spread using a long pseudonoise code generated by a linear feedback PN generator, the mask of which is selected in accordance with the transmission rate of the variable data and the specific user transmitting the data. Thus, by identifying at the receiver which mask will allow the received waveform to be correctly despread, the rate of the data can be determined. In the second embodiment of the present invention a preamble from a predetermined set of preambles is punctured into the outgoing pilot signal to provide rate indication information. In the third embodiment, the rate indication signal is encoded in accordance with a set of orthogonal functions which are part of the indication of the rate of the data packet.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIGS. 7A–7H are diagrams illustrating a proposed set of preamble formats for use in the second embodiment of the present invention;

DETAILED DESCRIPTION OF THE PREFERRED EMBODIMENTS

Figure 1:
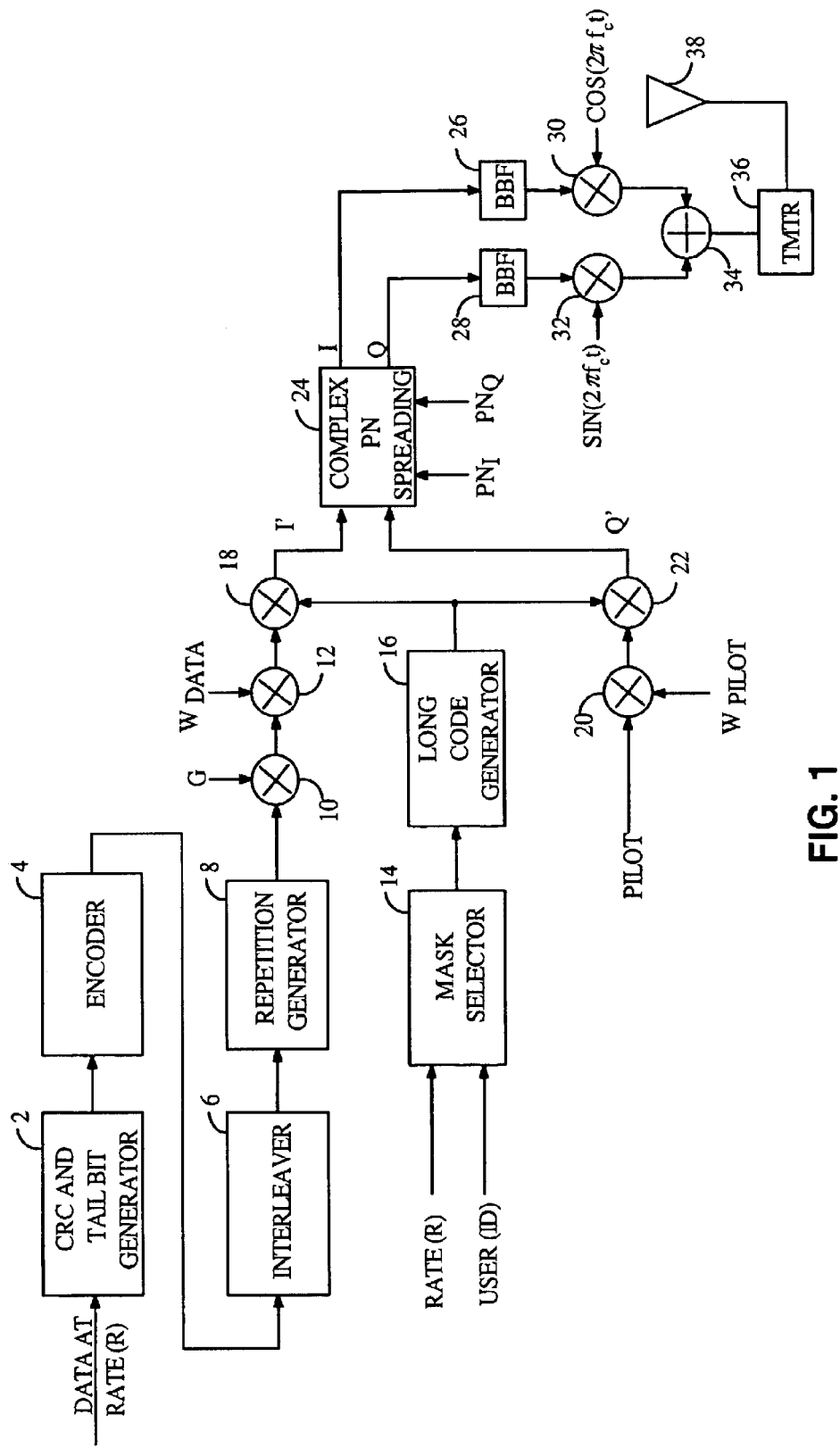
FIG. 1 is a block diagram of the transmission system of the first embodiment of the present invention.

Referring to the figures, FIG. 1 illustrates the transmission apparatus of the present invention in block diagram form. The data packet to be transmitted is provided to cyclic redundancy check (CRC) and tail bit generator 2. The number of bits of data in the data packet determines the effective rate R of the transmission. CRC and tail bit generator 2 generates a set of CRC bits such as parity bits in accordance with methods that are well known in the art. The CRC bits along with a set of tail bits are appended to the data packet.

The data packet with the appended CRC and tail bits is provided to forward error correction encoder 4. Encoder 4 can be any form of digital forward error correction encoder, such as a convolutional encoder, a Reed Solomon encoder or other known forward error correction coder. In the exemplary embodiment, encoder 4 is a turbo coder, the design of which is well known in the art and is described in detail in U.S. Pat. No. 5,446,747, entitled "ERROR-CORRECTION CODING METHOD WITH AT LEAST TWO SYSTEMATIC CONVOLUTIONAL CODINGS IN PARALLEL, CORRESPONDING ITERATIVE DECODING METHOD, DECODING MODULE AND DECODER," which is incorporated by reference herein.

The encoded packet is provided to interleaver 6 which reorders the encoded symbols in the packet to provide temporal diversity that provides for additional protection against burst errors. The reordered packet is then provided to repetition generator 8 which provides redundant versions of the interleaved symbols into the packet so as to output packets of fixed number of symbols regardless of the data rate of the packet R. The packet from repetition generator 8 is provided to gain element 10 which adjusts the gain of the packet in accordance with the rate R of the packet and in order to provide the correct power ratio between the pilot channel and the data channel.

The packet from gain element 10 is provided to subchannel spreading element 12. Subchannel spreading element 12 spreads the packet using a short spreading sequence ($W_{data}$) that is used to allow the receiver to separate the pilot channel from the data channel. In the exemplary embodiment, the short spreading sequences used are short orthogonal Walsh sequences. The use of short orthogonal Walsh sequences to provide channelization on the reverse link is described in detail in the aforementioned U.S. patent application Ser. No. 08/856,428, now abandoned. The spread packet from subchannel modulation element 12 is provided to scrambling element 18. Scrambling element 18 scrambles the packet in accordance with a pseudonoise (PN) sequence generated by long code generator 16.

Figure 2:
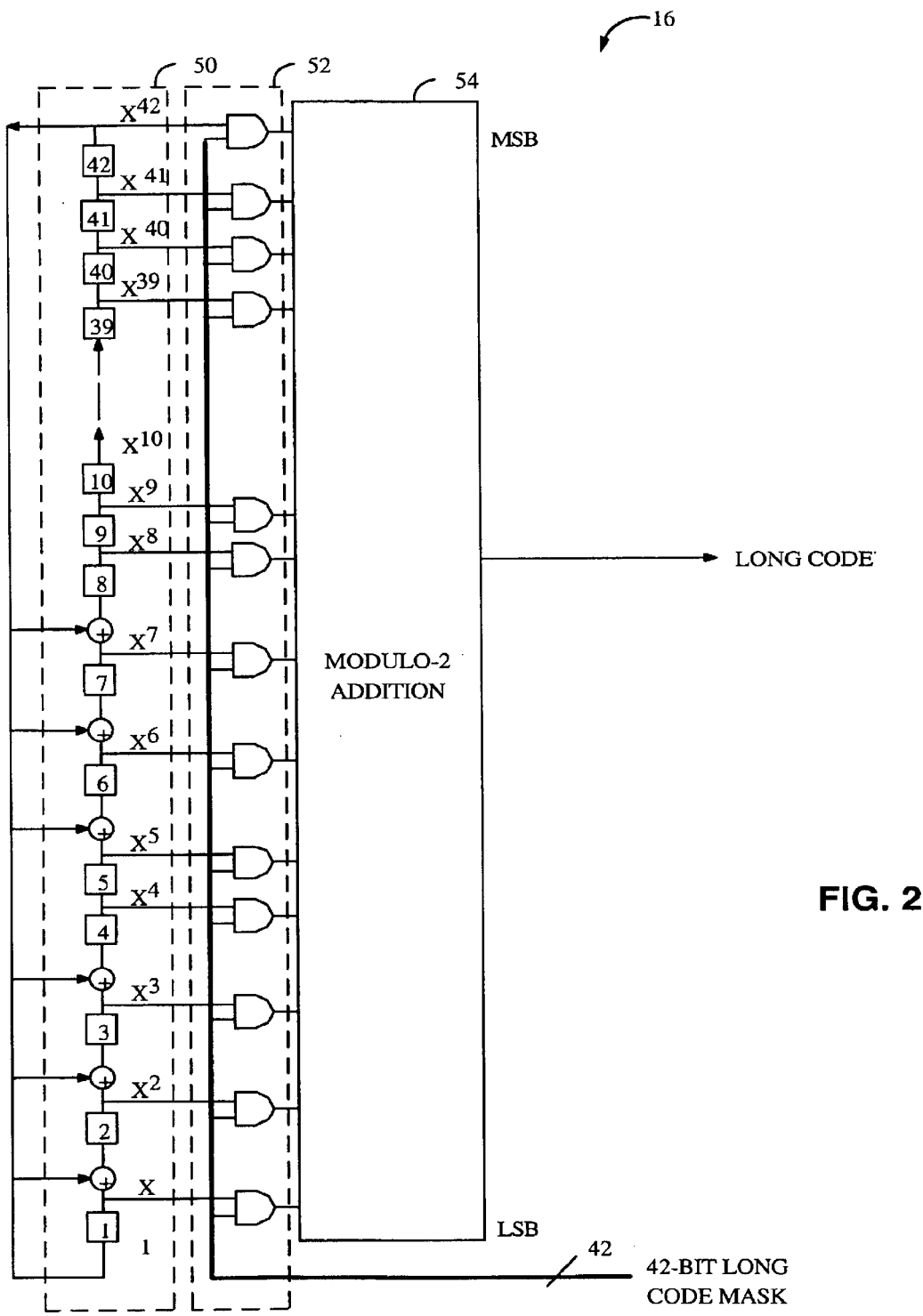
FIG. 2 is a block diagram of an exemplary PN generator.

Turning to FIG. 2, an exemplary embodiment of the PN generator 16 is illustrated. The packet is covered using a pseudonoise (PN) sequence derived from a IIR filter 50 composed of a linear shift register with associated summing elements and taps. In the exemplary embodiment, IIR filter 50 is a 42 tap IIR filter that is used in the scrambling of reverse link transmissions in the Telecommunications Industry Association standard TIA/EIA/IS-95-A, entitled "Mobile Station-Base Station Compatibility Standard for Dual-Mode Wideband Spread Spectrum Cellular System."

The outputs from IIR filter 50 are provided to a bank of AND gates 52. Each of the outputs of IIR filter 50 is ANDed with a 42-bit Long Code Mask. The results of the ANDing operations are provided to modulo-2 addition means 54, which performs the summing operation to provide the long code sequence as a serial output. The long code generated in this fashion has important autocorrelation characteristics that are well known in the art. Long codes of this fashion are used in cellular CDMA systems to distinguish one mobile station from another. When two distinct long code masks are used, the resulting two long code sequences are uncorrelated or at least have very limited correlation. The present invention takes advantage of this property of the generated long codes in order to encode the rate information.

Figure 3:
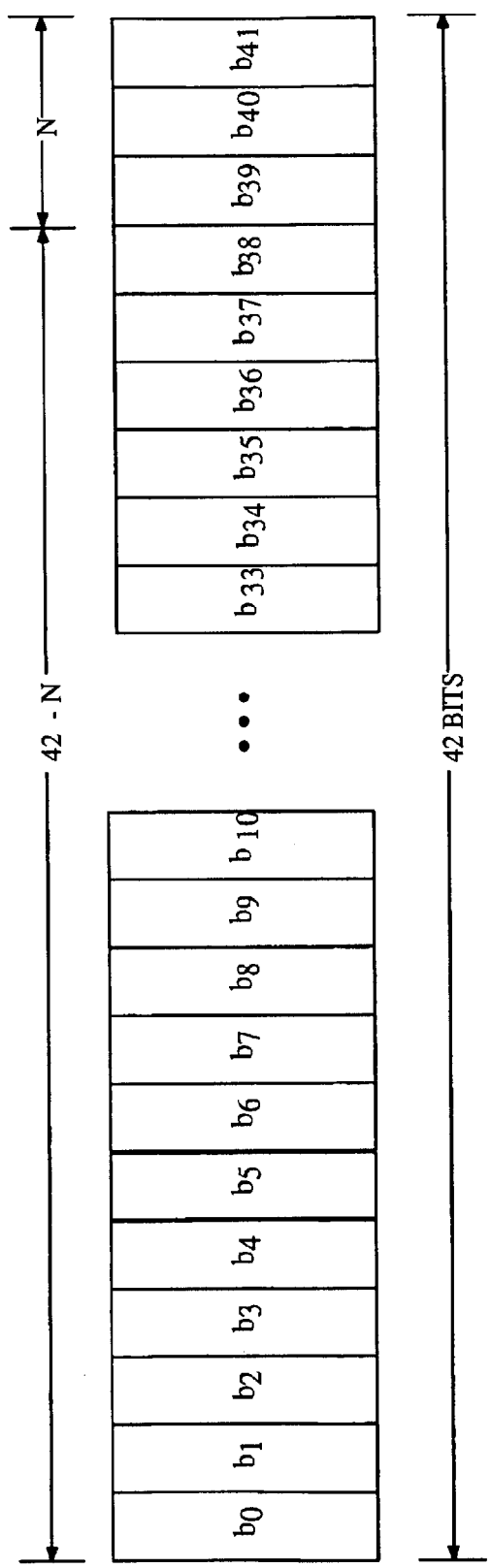
FIG. 3 is a diagram illustrating the bits used for the long code mask.

As shown in FIG. 3, in the present invention the exemplary 42-bit long code mask comprises n bits which identify the rate of transmission and 42-n bits, which are used to identify the user. For example, if there are two possible transmission rates, then a single bit (n=1) would be sufficient to identify the transmission rate. If there were 3 or 4 possible transmission rates, then two bits (n=2) would be necessary to specify the rate, and so on. In FIG. 3, the bits identifying the transmission rate are the most significant bits (MSBs), however, any of the bits would be equally applicable, and the bits identifying the rate need not even be consecutive.

Returning to FIG. 1, the information regarding the rate of the information is provided to mask selector 14 that provides a mask in accordance with the rate information R and the identity of the transmitting remote station. Mask selector 14 could be implemented using a memory device such as a RAM or ROM device that stores mask codes that are retrieved in accordance with the rate of the packet to be transmitted. The selected mask is provided to long code generator 16 which provides the generated long code to scrambling elements 18 and 22.

In the exemplary embodiment, the remote station transmits both a data channel and a pilot channel that allows for coherent demodulation of its transmitted signal. The present invention is not limited to systems that transmit a data channel with an accompanying pilot channel nor is it limited to reverse link transmissions. The present invention is equally applicable to any variable rate transmission system in which the receiver does not know a priori the rate of the transmission and in which the data is scrambled using a pseudonoise sequence.

A set of pilot signal bits is provided to subchannel spreading element 20. The pilot signal carries no information, and the exemplary embodiment is simply a string of zeroes. The pilot bits are spread by a short Walsh sequence $W_{pilot}$, which in the exemplary embodiment is orthogonal to $W_{data}$, and is used to distinguish the pilot channel from the data channel. The subchannel spread packet is provided to scrambling element 22, which as described previously scrambles the packet in accordance with the long code generated by long code generator 16.

The PN scrambled packets from scrambling elements 18 and 22 are provided to complex PN spreading means 24, which performs a complex spreading operation as described in aforementioned U.S. patent application Ser. No. 08/856,428. The inputs I and Q are complex spread by the input psueudonoise sequences $PN_i$ and $PN_q$ to provide outputs I and Q in accordance with the following equations:

$$I = I'PN_I - Q'PN_Q, \quad (1)$$

$$Q = I'PN_Q + Q'PN_I. \quad (2)$$

The outputs from complex PN spreading means 24 are provided to baseband filters (BBF) 26 and 28 which provide the appropriate filtering of the resultant waveform. The filtered waveforms are provided to upconversion elements 30 and 32 and are upconverted to the carrier frequency ($f_c$) in accordance with a QPSK modulation format. The two upconverted waveforms are summed in summing element 34, the output of which is provided to transmitter (TMTR) 36, which amplifies and filters the signal and provides it to antenna 38 for transmission.

Figure 4:
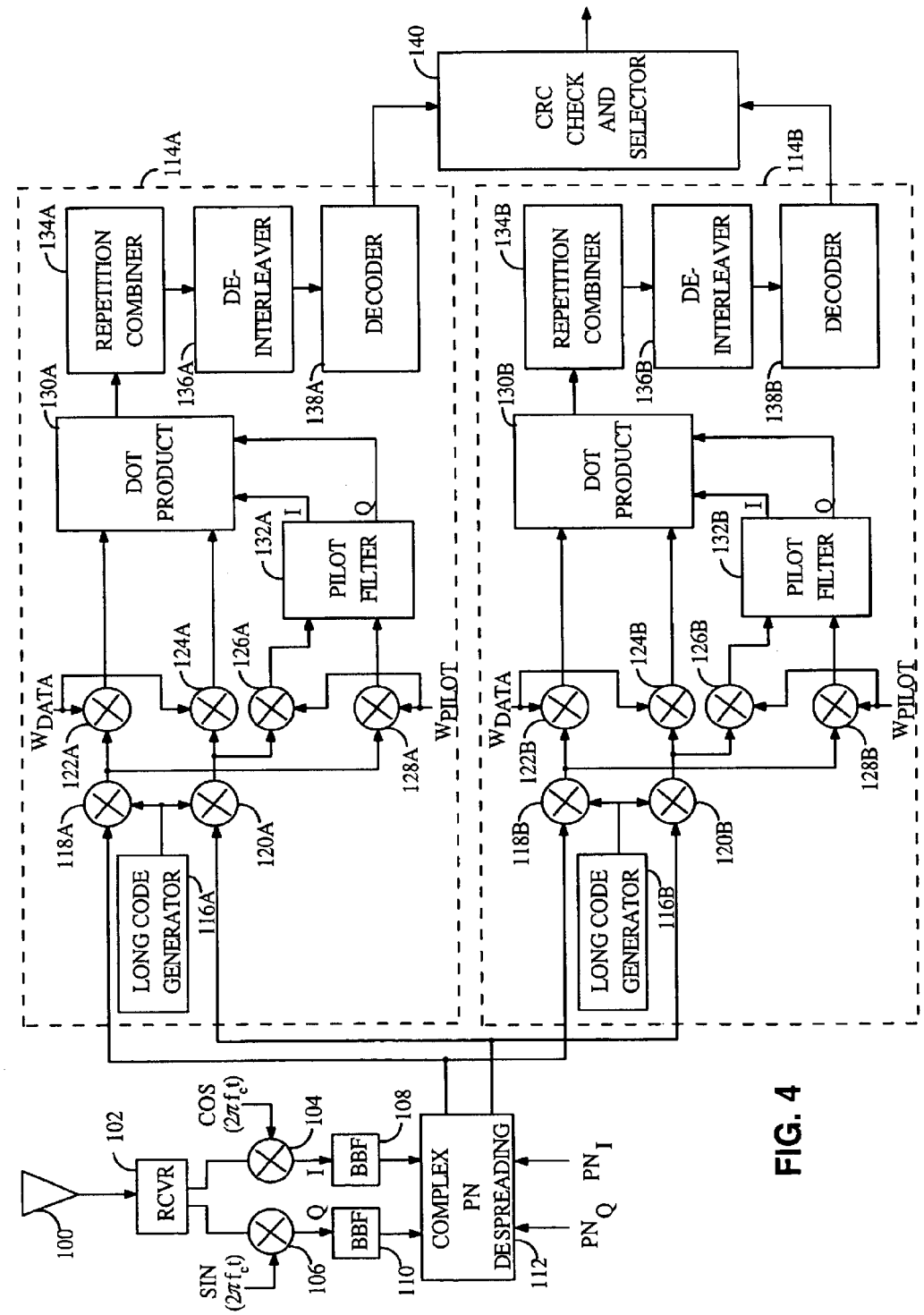
FIG. 4 is a block diagram illustrating the first receiver system for receiving variable rate data transmitted by means of the first embodiment of the present invention.

FIG. 4 illustrates a first receiver system for receiving the waveform transmitted in accordance with FIG. 1. The signal is received at antenna 100 and provided to receiver (RCVR) 102, which filters and amplifies the received signal. The received signal is then provided to downconverters 104 and 106, which downconvert the received signal in accordance with a QPSK downconversion methodology as is well known in the art. The I and Q components of the downconverted signals are provided to baseband filters (BBF) 108 and 110, which filter the signals and provide the baseband signals to complex PN despreading means 112. The implementation of complex despreading means 112 is described in detail in the aforementioned U.S. patent application Ser. No. 08/856,428, now abandoned, and removes the PN spreading that was described in equations 1 and 2 above.

Again, the exemplary embodiment illustrates a method for distinguishing between two possible rates. One skilled in the art will understand that the receiver structure shown can be extended to an arbitrary number of potential rates by increasing the number of demodulator/decoder elements 114. In the exemplary embodiment, the complex despread packet data is provided to demodulator/decoders 114a and 114b. It will be understood by one skilled in the art that the demodulation can also work with one hardware element running at a higher rate. Moreover, the receiver can descramble the pilot using the different long code masks corresponding to the different rate hypothesis and estimate the resulting energy obtained by using each hypothesis.

Demodulator/decoder 114a demodulates the data using a long code mask associated with the first data rate hypothesis and demodulator/decoder 114b demodulates the data using a long code mask associated with the second data rate. As described previously, the two long PN codes corresponding to the two rate hypotheses will be uncorrelated. The demodulation and decoding of the data using the correct long code mask (corresponding to the correct rate hypothesis) will demodulate and decode correctly, while the decoding of the data using the incorrect long code mask (corresponding to the incorrect rate hypothesis) will demodulate and decode incorrectly. The correct demodulation and decoding, corresponding to the correct hypothesis of the data will be detected by CRC check and selector 140. CRC check and selector element 140 will generate a set of CRC bits from the decoded data estimates and will compare those with the decoded CRC estimates. If the generated CRC bits match the decoded CRC estimates, the data at that rate will be provided to the user.

Turning to the details of demodulator/decoders 114, the complex PN despread packets are provided to descrambling elements 118 and 120. The packets are descrambled in accordance with long PN codes generated by long code generators 116, which generate the long codes in accordance with a long code mask corresponding to the mobile station and a rate from the set of possible rates as described with respect to the transmission process.

The descrambled data packets from descrambling elements 118 and 120 are provided to subchannel despreading elements 122, 124, 126 and 128, which remove the Walsh subchannel coverings from the received data stream. Subchannel despreading elements 122 and 124 remove the data subchannel covering from the descrambled data in accordance with the data subchannel Walsh sequence ($W_{data}$). Subchannel despreading elements 126 and 128 remove the pilot subchannel coverings from the descrambled data in accordance with the pilot subchannel Walsh sequence ($W_{pilot}$).

The output from subchannel despreading elements 126 and 128 are provided to pilot filter 132 which performs a moving average filtering operation on the signal in order to reduce the effects of noise on the received pilot signal. The I and Q components from pilot filter 132 are provided to dot product circuit 130 which performs a coherent demodulation of the QPSK data channel. The design of dot product elements is well known in the art and is described in detail in U.S. Pat. No. 5,506,865, entitled "PILOT CARRIER DOT PRODUCT CIRCUIT," which is assigned to the assignee of the present invention and incorporated by reference herein.

The demodulated data signal out of dot product element 130 is provided to repetition combiner 134. Repetition combiner 134 combines the repeated symbols in the packet in accordance with the rate hypothesis being tested by the demodulation/decoder 114. Deinterleaver 136, which reorders the symbols in accordance with a rate dependent deinterleaving format, provides the reordered symbols. The reordered symbols are provided to decoder 138, which decodes the symbols. In the exemplary embodiment, decoder 138 is a turbo decoder, the implementation of which is well known in the art and is described in detail in U.S. Pat. No. 5,446,747. The present invention is equally applicable to other decoder structures such as trellis decoders and block decoders.

The decoded data packets from demodulator/decoder 114a and 114b are provided to CRC check and selector 140. In the exemplary embodiment, the CRC bits are checked and the data that passes the CRC check is output as the data demodulated and decoded at the correct rate. The present invention also anticipates the use of other methods for packet selection such as those involving the use of the accumulated metric from demodulator/decoder 138, estimates of received pilot energy following despreading by the different long code masks, or the use of symbol error rate (SER), which depend on the number of symbol corrections made by demodulator/decoder 138.

Figure 5:
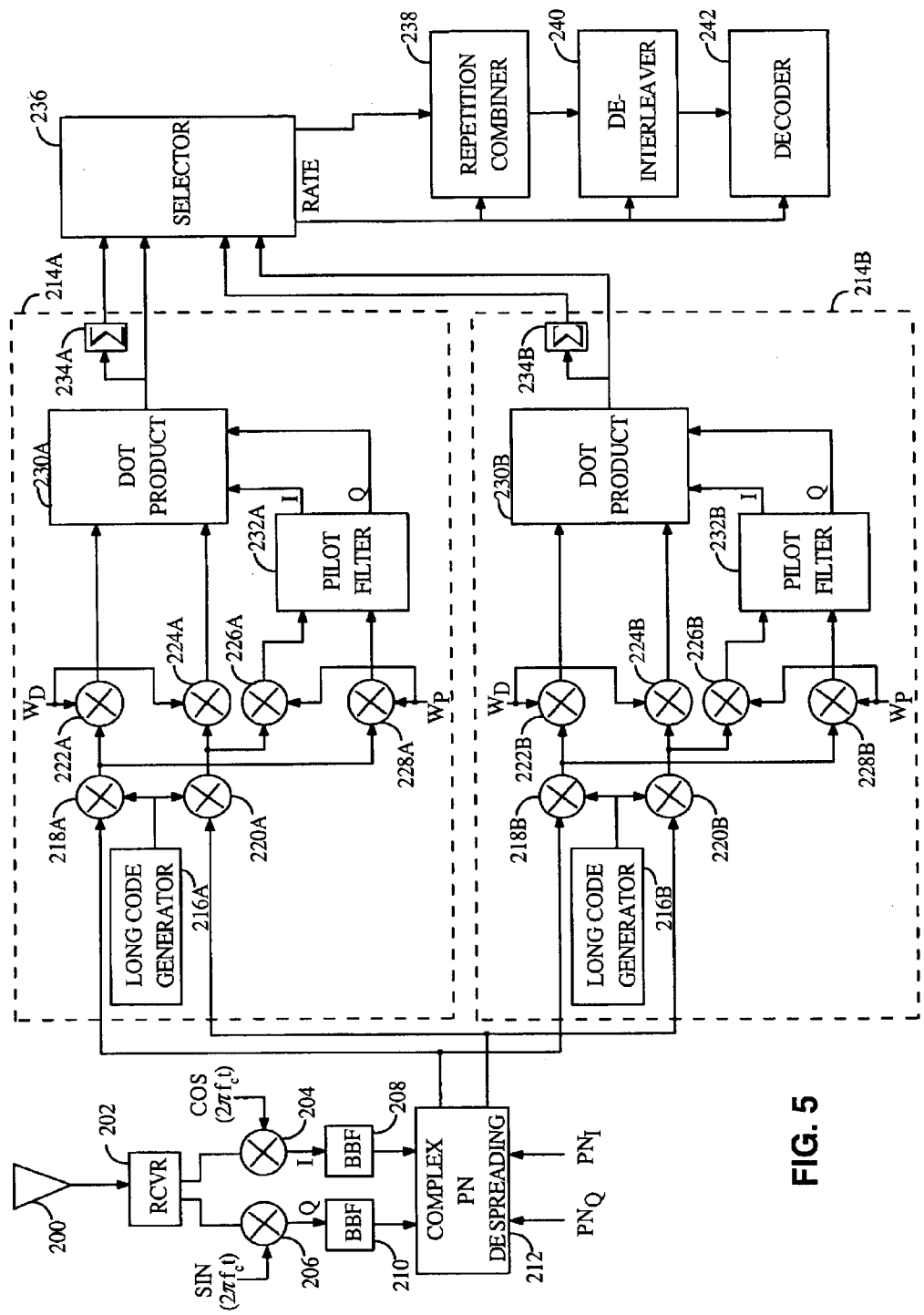
FIG. 5 is a block diagram illustrating the second receiver system for receiving variable rate data transmitted by means of the first embodiment of the present invention.

FIG. 5 illustrates a second receiver system for receiving the waveform transmitted in accordance with FIG. 1. The signal is received at antenna 200 and provided to receiver (RCVR) 202, which filters and amplifies the received signal. The received signal is then provided to downconverters 204 and 206, which downconvert the received signal in accordance with a QPSK downconversion methodology as is well known in the art. The I and Q components of the downconverted signals are provided to baseband filters (BBF) 208 and 210, which filter the signals and provide the baseband signals to complex PN despreading means 212, which despread the signals in accordance with pseudonoise sequences $PN_I$ and $PN_Q$. The implementation of complex PN despreading means 212 is described in detail in the aforementioned U.S. patent application Ser. No. 08/856,428 and removes the PN spreading that was described in equations 1 and 2 above.

Again, the exemplary embodiment illustrates a method for distinguishing between two possible rates. One skilled in the art will understand that the receiver structure shown can be extended to an arbitrary number of potential rates by increasing the number of demodulator elements 214. In the exemplary embodiment, the complex PN despread packet data is provided to demodulators 214a and 214b.

Demodulator 214a demodulates the data using a long code mask associated with the first data rate hypothesis and demodulator 214b demodulates the data using a long code mask associated with the second data rate hypothesis. As described previously, the two long PN codes corresponding to the two rate hypotheses will be uncorrelated. The demodulation of the data using the correct long code mask (corresponding to the correct rate hypothesis) will demodulate correctly yielding a high energy demodulated signal, while the decoding of the data using the incorrect long code mask (corresponding to the incorrect rate hypothesis) will demodulate incorrectly yielding low energy noise. The correct demodulation, corresponding to the correct rate hypothesis will be detected by selector 236, which will compare the energies of the two demodulated data streams.

Selector element 236 will provide the correctly demodulated data packet to repetition combiner 238, which combines the data in accordance with the detected rate of the received data. The combined symbols are provided to deinterleaver 240, which reorders the symbols in accordance with a deinterleaving format selected on the basis of the determined rate. The reordered symbols are provided to decoder 242, which decodes the symbols in accordance with a predetermined error correction format. In the exemplary embodiment, decoder 242 is a turbo decoder, though the present invention is equally applicable to other decoders such as trellis or block decoders. The decoded data packet is then output to the user.

Turning to the details of demodulators 214, the complex PN despread packets are provided to descrambling elements 218 and 220. The packets are descrambled in accordance with long PN codes generated by long code generators 216 which generate the long codes in accordance with a long code mask corresponding to a rate from the set of possible rates as described with respect to the transmission process.

The descrambled data packets from descrambling elements 218 and 220 are provided to subchannel despreading elements 222, 224, 226 and 228, which remove the Walsh subchannel coverings from the received data stream. Subchannel despreading elements 222 and 224 remove the pilot subchannel covering from the descrambled data in accordance with the data subchannel Walsh sequence ($W_{data}$). Subchannel despreading elements 226 and 228 remove the data subchannel coverings from the descrambled data in accordance with the pilot subchannel Walsh sequence ($W_{pilot}$).

The output from subchannel despreading elements 226 and 228 are provided to pilot filter 232, which performs a moving average filtering operation on the signal in order to reduce the effects of noise on the received pilot signal. The I and Q components from pilot filter 232 are provided to dot product circuit 230 which performs a coherent demodulation of the QPSK data channel. The design of dot product elements is well known in the art and is described in detail in U.S. Pat. No. 5,506,865, entitled "PILOT CARRIER DOT PRODUCT CIRCUIT," which is assigned to the assignee of the present invention and incorporated by reference herein.

The demodulated data signal out of dot product element 230 is provided to energy calculator 234 and to selector 236. Energy calculator 234 computes the energy of the demodulated packet and provides the energy value to selector 236. Selector 236 selects the demodulated packet with the greatest amount of energy. The selected packet is provided to repetition combiner 238, which combines the redundant symbol energies and provides the combined energies to deinterleaver 240. Deinterleaver 240 reorders the combined symbol energies and provides them to decoder 242. Decoder 242 decodes the data and provides it to the user.

Figure 6:
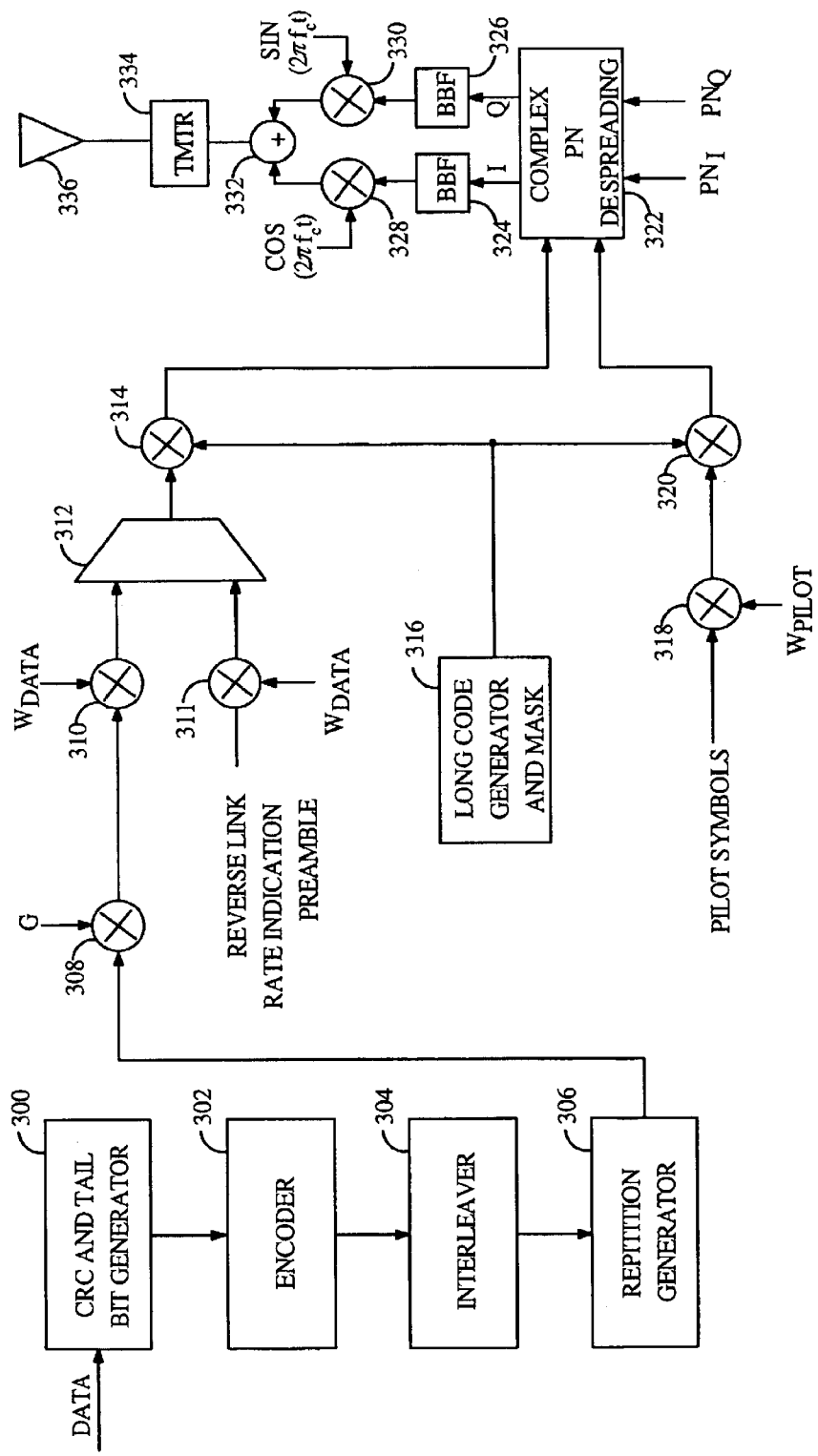
FIG. 6 is a block diagram illustrating the transmitter system of the second embodiment of the present invention.

FIG. 6 illustrates a transmission system for the second exemplary embodiment of the present invention. In the second embodiment of the present invention, each data packet is transmitted with a preamble indicating the data rate of the transmitted packet. The data packet is provided to CRC and tail bit generator 300. CRC and tail bit generator 300 generates a set of redundant check bits and appends those check bits along with a set of tail bits to the packet.

The packet output by CRC and tail bit generator 300 is provided to encoder 302, which performs a forward error coding on the packet. In the exemplary embodiment, encoder 302 is a turbo encoder. The encoded symbols are provided to interleaver 304, which reorders the symbols in accordance with a predetermined interleaving format. The reordered symbols are provided to repetition generator 306, which generates a set of redundant symbols to output a packet of a fixed number of symbols regardless of the data rate of the packet.

The packet from repetition generator 306 is provided to gain adjustment means 308, which adjusts the gain of the packet based on the data rate of the packet, and the $E_b/N_0$ required for proper transmission of the reverse link signal. The gain adjusted packet is provided to multiplexer 312. In the exemplary embodiment, multiplexer 312 performs a simple switching operation that punctures a rate indication preamble into the data packet by overwriting a first portion of the frame. The overwritten data could be recovered by means of the forward correction decoder at the receiver. In an alternative embodiment, the packet length could be adjusted so that none of the data would require to be overwritten by the preamble.

In the current embodiment of the present invention, the set of rate indication preambles are of lengths that vary in accordance with the data rate of the packet to be transmitted. In the exemplary embodiment, the lower the data rate of the packet, the longer will be the preamble included with the packet. In the exemplary embodiment, the set of possible rates differ from one another by factors of two, for example 9.6 Kbps, 19.2 Kbps, 38.4 Kbps and 76.8 Kbps. In the exemplary embodiment, the length of the preamble varies in inverse proportion with the data rate of the packet. In this way, the proportion of the data in the packet that is overwritten by the preamble remains constant due to the variable duration of the packets to be transmitted as a function of the data rate.

Turning to FIGS. 7A–7D, an exemplary set of four preambles is illustrated. In the exemplary embodiment, FIG. 7A illustrates the proposed preamble for the highest possible rate in the rate set (i.e. 76.8 Kbps). FIG. 7B illustrates the proposed preamble for the second highest possible rate in the rate set (i.e. 36.4 Kbps). FIG. 7C illustrates the proposed preamble for the third highest possible rate in the rate set (i.e. 19.2 Kbps). FIG. 7D illustrates the proposed preamble for the lowest possible rate in the rate set (i.e. 9.6 Kbps).

The important characteristic to be observed regarding the proposed preamble structure is that the preamble sequences are orthogonal over selected time periods. For example, the preamble sequence illustrated in FIG. 7A is orthogonal to preamble sequences illustrated in FIGS. 7B, 7C and 7D over the period of its duration (0 to 4T). Similarly, the preamble sequence illustrated in FIG. 7B is orthogonal to the preamble sequences illustrated in FIGS. 7C and 7D over the period of its duration (0–8T). Lastly, the preamble sequence illustrated in FIG. 7C is orthogonal to the preamble sequence illustrated in FIG. 7D over the period of its duration (0–16T). The benefit of the orthogonality of the preamble waveforms is realized at the receiver, by making detection of the preamble more accurate, because the correlation between two orthogonal sequences is zero. Thus, by passing the preamble sequence through a correlator, such as a matched filter, will yield zero energy for all preamble rate hypotheses except the correct preamble rate hypothesis. FIGS. 7E–7H illustrate an alternative set of proposed preamble waveforms which manifest the same orthogonal properties as those illustrated in 7A–7D.

Referring back to FIG. 6, the data packet is provided to subchannel spreading element 310 which covers the packet in accordance with the Walsh sequence $W_{data}$. In addition, the rate indication signal is Walsh covered by subchannel spreading element 311. The data signal and the preamble signal are combined by multiplexer 312. In an alternative embodiment, the data packet could be combined with the preamble prior to performing the Walsh covering operation. The combined Walsh covered packet is then provided to scrambling means 314, which scrambles the packet in accordance with a long code sequence provided by long code generator and mask 316. The long code is uniquely assigned to the remote station and used to distinguish the transmission of different remote stations simultaneously communicating with a given base station.

In the modulation of the pilot signal, a set of predetermined pilot symbols are provided to Walsh covering means 318. In the exemplary embodiment, the pilot symbol sequence is a string of all zeroes. Walsh covering means 318 covers the pilot symbols in accordance with the Walsh sequence $W_{pilot}$. The Walsh covered pilot symbols are provided to spreading means 320 which scrambles the Walsh covered pilot symbols in accordance with a long PN sequence from long code generator and mask 316. The outputs from scramblers 314 and 320 are input to complex PN spreading element 322 along with pseudonoise sequences $PN_I$ and $PN_Q$. Complex PN spreading element 322 performs a complex PN spreading on the input signal in accordance with equations 1 and 2 above.

The I and Q channel outputs from the complex PN spreading element 322 are provided to baseband filters (BBFs) 324 and 326. Baseband filters 324 and 326 filter the baseband signals and provide the filtered signals to upconverters 328 and 330. Upconverters 328 and 330 upconvert the signals, in accordance with a QPSK modulation format wherein the resulting upconverted signals are 90 degrees out of phase with one another. The upconverted signals are summed in summing element 332 and provided to transmitter (TMTR) 334 where the signal is amplified and filtered and transmitted through antenna 336.

Figure 8:
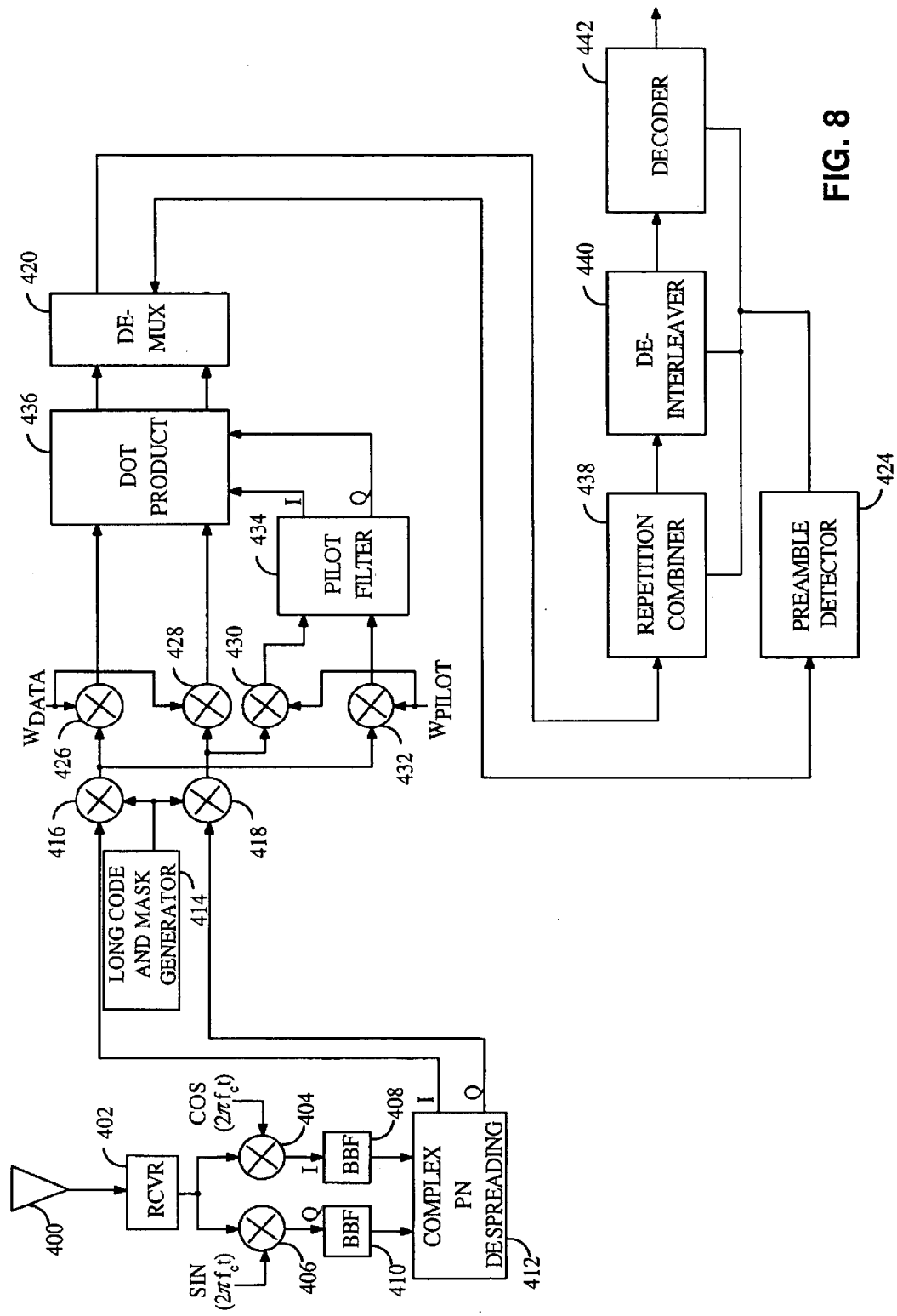
FIG. 8 is a block diagram illustrating the receiver system of the second embodiment of the present invention.

FIG. 8 illustrates the receiver system of the second embodiment. The signal is received at antenna 400 and provided to receiver (RCVR) 402, which filters and amplifies the received signal. The received signal is then provided to downconverters 404 and 406, which downconvert the received signal in accordance with a QPSK downconversion methodology as is well known in the art. The I and Q components of the downconverted signals are provided to baseband filters (BBF) 408 and 410, which filter the signals and provide the baseband signals to complex PN despreading element 412. The implementation of complex PN despreading element 412 is described in detail in the aforementioned U.S. patent application Ser. No. 08/856,428, now abandoned, and removes the complex PN spreading that was described in equations 1 and 2 above.

The despread I and Q signals are provided descrambling elements 416 and 418. Descrambling elements 416 and 418 descramble the signals in accordance with a long code provided by long code and mask generator 414. The descrambled I and Q signals are provided by descrambling elements 416 and 418 to subchannel despreading elements 426, 428, 430 and 432, which remove the Walsh subchannel coverings from the received signals. Subchannel despreading elements 426 and 428 remove the data subchannel covering from the descrambled data in accordance with the data subchannel Walsh sequence ($W_{data}$). Subchannel despreading elements 430 and 432 remove the pilot subchannel coverings from the descrambled data in accordance with the pilot subchannel Walsh sequence ($W_{pilot}$).

The output from subchannel despreading elements 430 and 432 are provided to pilot filter 434 which performs a moving average filtering operation on the signal in order to reduce the effects of noise on the received pilot signal. The I and Q components from pilot filter 434 are provided to dot product circuit 436 which performs a coherent demodulation of the QPSK data channel. The design of dot product elements is well known in the art and is described in detail in U.S. Pat. No. 5,506,865, entitled "PILOT CARRIER DOT PRODUCT CIRCUIT," which is assigned to the assignee of the present invention and incorporated by reference herein.

The demodulated data signal out of dot product element 436 is provided to demultiplexer (De-Mux) 420. Demultiplexer 420 outputs the data initially to preamble detector 424. Preamble detector 424 determines the rate indicated by the despread preamble. Many implementations of preamble detectors are possible. For example, preamble detector 424 can be implemented using a bank of matched filters or other correlators. Upon finding a preamble with sufficient correlation energy to one of the predetermined set of preambles, the rate is declared as having been successfully detected. In an alternative embodiment, the preamble could be detected noncoherently, in which case the despread data would be provided directly to the preamble detector through demultiplexer 420 from subchannel despreading elements 426 and 428.

Upon successful detection of one of the candidate preambles, preamble detector 424 sends a signal indicative of the detected rate to repetition combiner 438, deinterleaver 440 and decoder 442, which perform their operations in accordance with this information. In addition, upon detection of the end of the preamble message, preamble detector sends a signal indicating the detection of the end of the preamble to demultiplexer 420, in response to which demultiplexer 420 begins to output the despread data to repetition combiner 438.

Repetition combiner 438 combines the repeated symbol energies in the packet in accordance with the detected rate of the received packet. The combined symbol energies are provided to deinterleaver 440, which reorders the symbol energies in accordance with a deinterleaving format selected in accordance with the rate signal from preamble detector 424. The reordered symbols are provided to decoder 442 which decodes the symbols. In the exemplary embodiment, decoder 442 is a turbo decoder, the implementation of which is well known in the art and is described in detail in U.S. Pat. No. 5,446,747. The present invention is equally applicable to other decoder structures such as trellis decoders and block decoders. The decoded data estimates are output by decoder 442 to the user.

Figure 9:
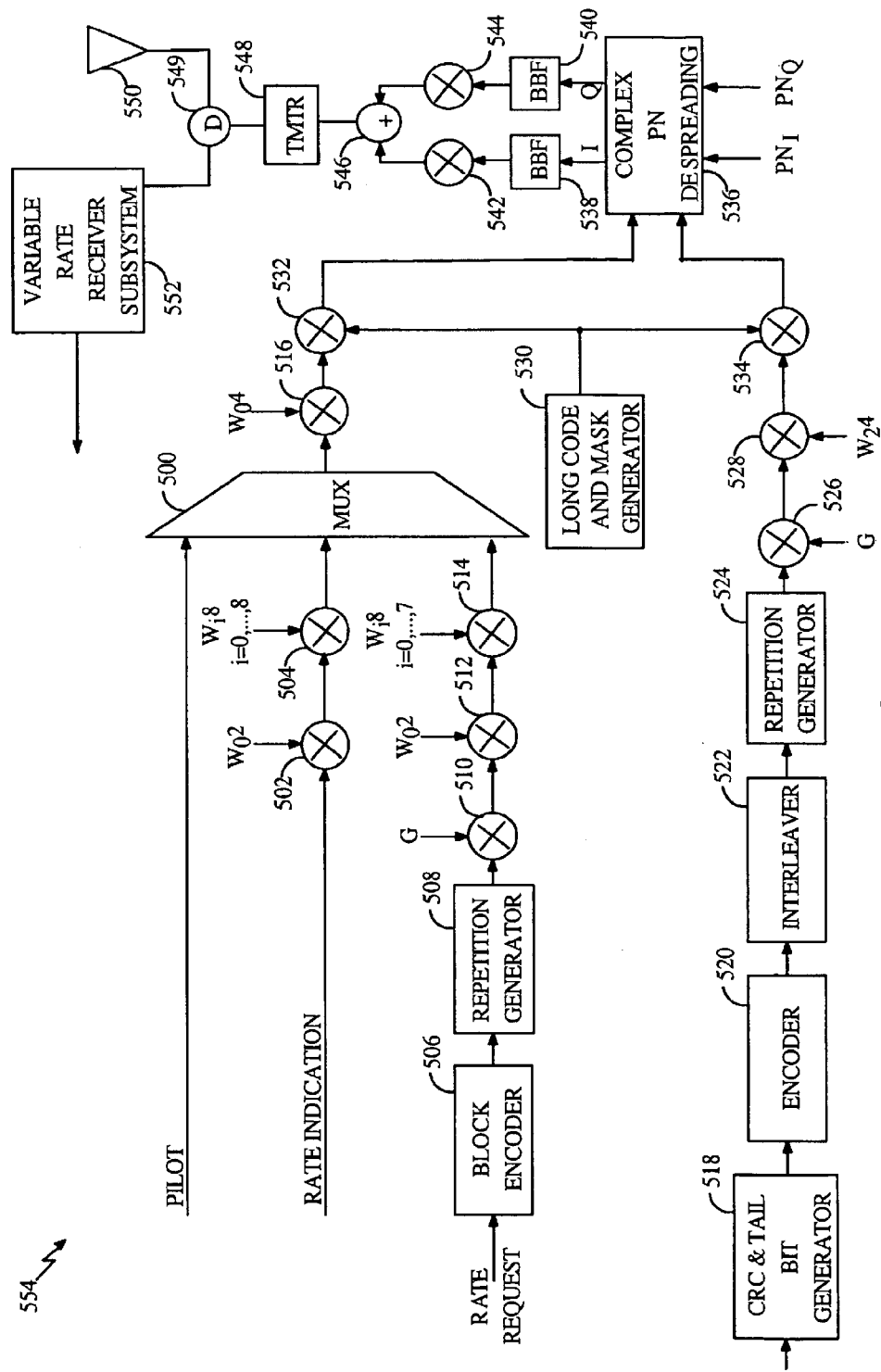
FIG. 9 is a block diagram of a remote station of the present invention illustrating the transmitter system of the third embodiment of the present invention.

FIG. 9 illustrates the preferred embodiment of the present invention for transmitting variable rate data. In the preferred embodiment, packets at different data rates contain a different number of information bits but span the same duration of time (i.e. 2 frames=32 slots=53 msec). The data transmission system again transmits a control channel distinct from a data channel. In the third embodiment of the present invention, the control channel includes three types of information, which are time multiplexed together. The first type of information provided on the control channel is the pilot signal. The second is a rate indication message that indicates the rate of the data packet being transmitted concurrently with the control channel information. The third is a rate request message which is the request by the remote station for a serving base station to provide data up to that rate.

In the preferred embodiment, the rate request information provides an indication both of the rate at which the remote station desires data to be downloaded to it, and also the base station or base station sector which the remote station wishes to perform the data transmission. In the preferred embodiment, the indication of which base station or sector of a predetermined set of base stations or sectors is based on a spreading function that will only be properly decoded by the base station sought to transmit to the remote station.

In identifying the Walsh function, the superscript identifies the order of the Walsh function, and the subscript identifies the index of the Walsh function of that order. Tables 1–3 below provide the Walsh function used in the current description.

TABLE 1

| | |
|---|---|
| $W_0^2$ | 00 |
| $W_1^2$ | 00 |

TABLE 2

| | |
|---|---|
| $W_0^4$ | 0000 |
| $W_1^4$ | 0101 |
| $W_2^4$ | 0011 |
| $W_3^4$ | 0110 |

TABLE 3

| | |
|---|---|
| $W_0^8$ | 0000 0000 |
| $W_1^8$ | 0101 0101 |
| $W_2^8$ | 0011 0011 |
| $W_3^8$ | 0110 0110 |
| $W_4^8$ | 0000 1111 |
| $W_5^8$ | 0101 1010 |
| $W_6^8$ | 0011 1100 |
| $W_7^8$ | 0110 1001 |

As in the previous two embodiments, the pilot channel symbols are a simple predetermined sequence. In the exemplary embodiment, the pilot symbols are a string of all zeroes, which are provided to multiplexer (MUX) 500. In the exemplary embodiment, the rate indication signal is a biorthogonal waveform. Thus, the input to Walsh covering element 502 is a binary value, the switching of which will result in the inversion of the resultant waveform. The symbols from Walsh covering element 502 are provided to Walsh covering element 504, which provides a second Walsh covering of the data, in which the index of the Walsh cover used provides the second portion of the rate indication value. In the exemplary embodiment, the second Walsh covering can take on eight different forms, which in combination with the input bit allows for the specification of up to 16 different rates. The Walsh symbols from Walsh covering element 504 are provided to multiplexer 500. In the exemplary embodiment, the rate indication is punctured into the pilot symbols once every slot for 32 consecutive slots (2 frames) spanned by a reverse link packet. This is to provide time diversity in a fading environment.

Turning to the rate request message, the exemplary embodiment provides for the specification of up to 16 possible forward link (from the base station to the remote station) data rates. A 4-bit index is provided to block encoder 506. In the exemplary embodiment, block encoder 506 maps the 4-bit input into a set of 8 possible Walsh symbols or their inverse using a (8,4,4) block code, the design and implementation of which are well known in the art. The block encoded rate request is then provided to repetition generator 508, which provides redundancy for the purposes of time diversity to protect against burst errors. The rate request message is then provided to gain adjustment element 510, which adjusts the gain to provide for proper reception of the rate request message. The gain adjusted signal is provided to Walsh covering element 512, which provides additional redundancy into the rate request message.

The Walsh covered message from Walsh covering element 512 is then provided to Walsh covering element 514. The purpose of Walsh covering element 514 is to indicate the best base station or base station sector from which to receive forward link data. In the exemplary embodiment, the remote station measures the C/I of transmissions from a set of base stations from which it is capable of receiving data. The base station, which can provide data to the remote station at the highest C/I, is selected by the remote station to download data to the remote station. The selected base station is indicated by using a Walsh sequence that will only be properly demodulated by the selected base station. All base stations and sectors in the remote stations active set (or set of base station/sectors capable of transmission to the remote station) will attempt to demodulate the signal using an assigned $W_i^8$ sequence. However, only the selected base station will correctly demodulate the request and will transmit to the remote station. The encoded rate request information, the rate indication, and the pilot data are time multiplexed together by multiplexer 500. The multiplexed control signal is provided to subchannel spreading element 516, which covers the resulting signal with a Walsh covering that is orthogonal to that used to cover the data subchannel.

On the data subchannel, variable rate data packets are provided to CRC and tail bit generator 518. CRC and tail bit generator 518 generates a set of redundant check bits and append those check bits along with a set of tail bits to the packet.

The packet output by CRC and tail bit generator 518 is provided to encoder 520, which performs a forward error coding on the variable rate data packet. In the exemplary embodiment, encoder 520 is a turbo encoder. The encoded symbols are then provided to interleaver 522, which reorders the symbols in accordance with a predetermined interleaving format. The reordered symbols are then provided to repetition generator 524, which generates a set of redundant symbols to output a packet containing a fixed number of symbols regardless of the data rate of the packet.

The packet from repetition generator 524 is provided to gain adjustment means 526 which adjusts the gain of the packet based on the data rate of the packet and the $E_b/N_0$ required for proper transmission of the reverse link signal. The gain adjusted packet is provided to subchannel spreading element 528, which covers the packet with a Walsh sequence that is orthogonal to the Walsh sequence used to cover the control packet.

The data packet and the control packet are provided to scrambling means 534 and 532, respectively. Scrambling elements 532 and 534 scramble the packets in accordance with a long code sequence provided by long code generator and mask 530. The outputs from scrambling elements 532 and 534 are input to complex PN spreading element 536 along with pseudonoise sequences $PN_I$ and $PN_Q$. Complex PN spreading element 536 performs a complex PN spreading on the input signal in accordance with equations 1 and 2 above.

The I and Q channel outputs from the complex PN spreading element 536 are provided to baseband filters (BBFs) 538 and 540. Baseband filters 538 and 540 filter the baseband signals and provide the filtered signals to upconverters 542 and 544. Upconverters 542 and 544 upconvert the signals, in accordance with a QPSK modulation format wherein the resulting upconverted signals are 90 degrees out of phase with one another. The upconverted signals are summed in summing element 546 and provided to transmitter (TMTR) 548 where the signal is amplified and filtered and provided through duplexer 549 for transmission through antenna 550.

In addition, remote station 554 includes a variable rate receive subsystem 552 for receiving forward link variable rate data from a base station or plurality of base stations capable of transmitting to remote station 554. The forward link variable rate data is received through antenna 550 and provided through duplexer 549 to variable rate receive subsystem 552.

Figure 10:
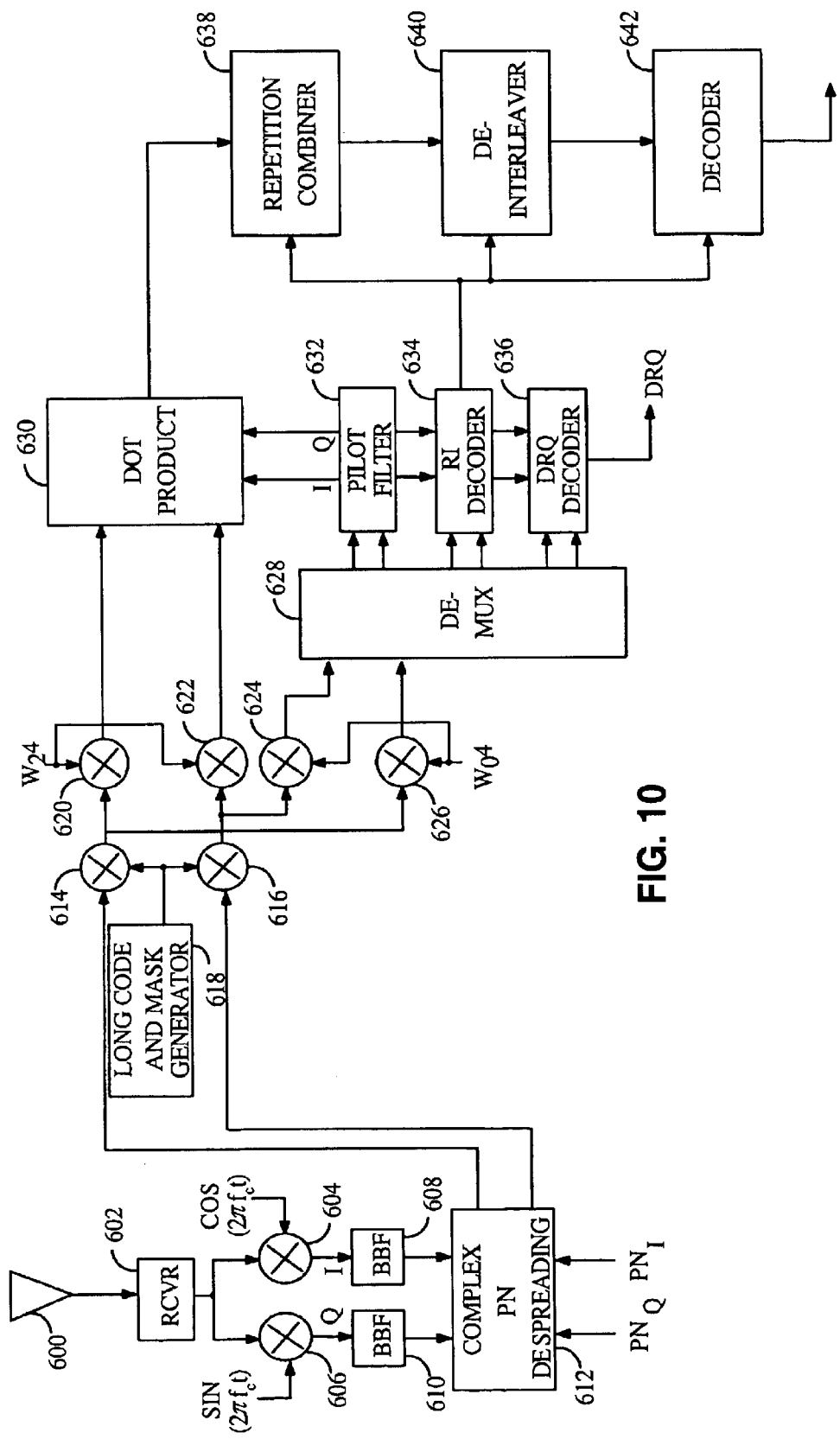
FIG. 10 is a block diagram illustrating the receiver system of the third embodiment of the present invention.
Figure 6:
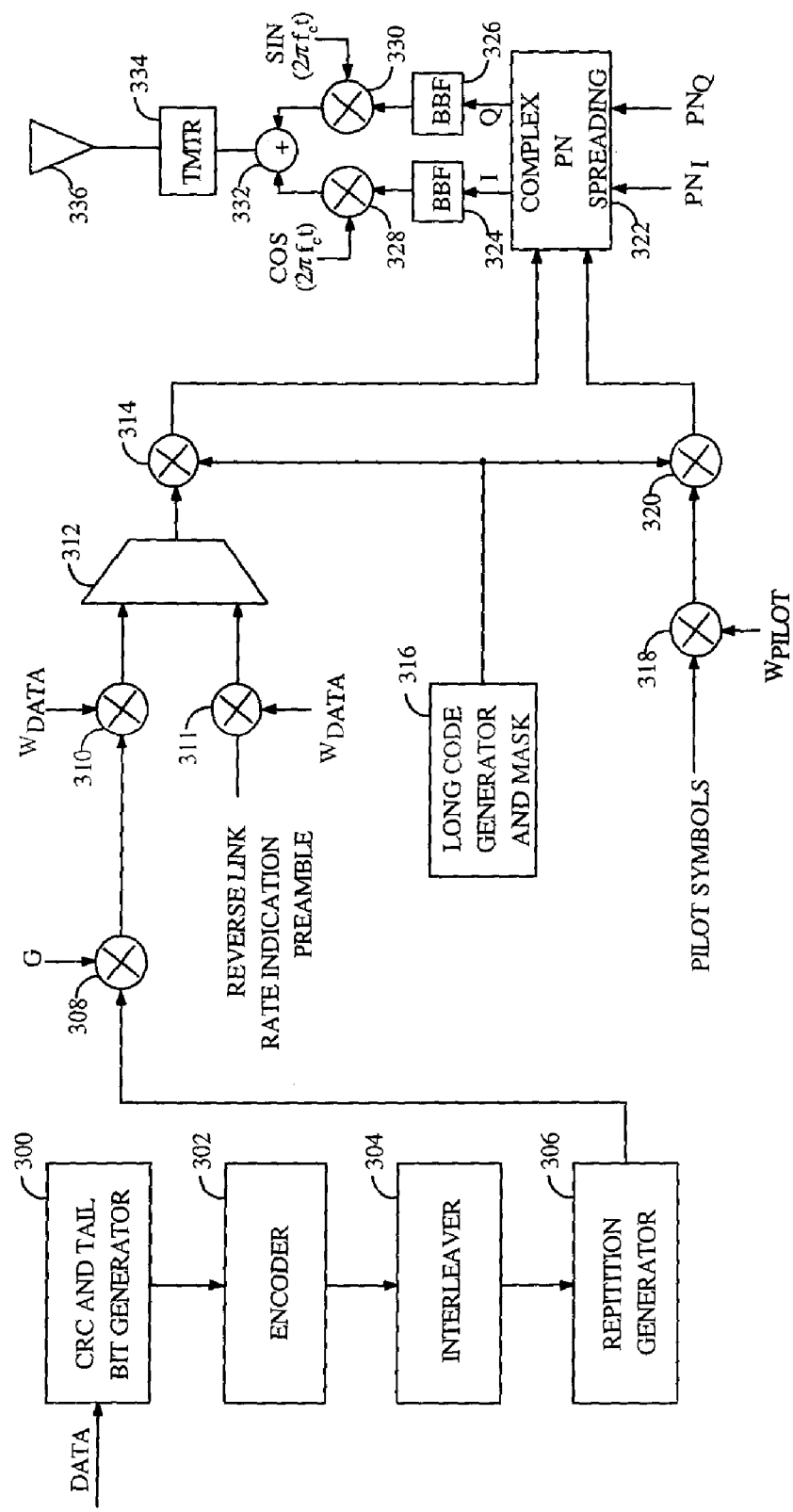
Figure 9:
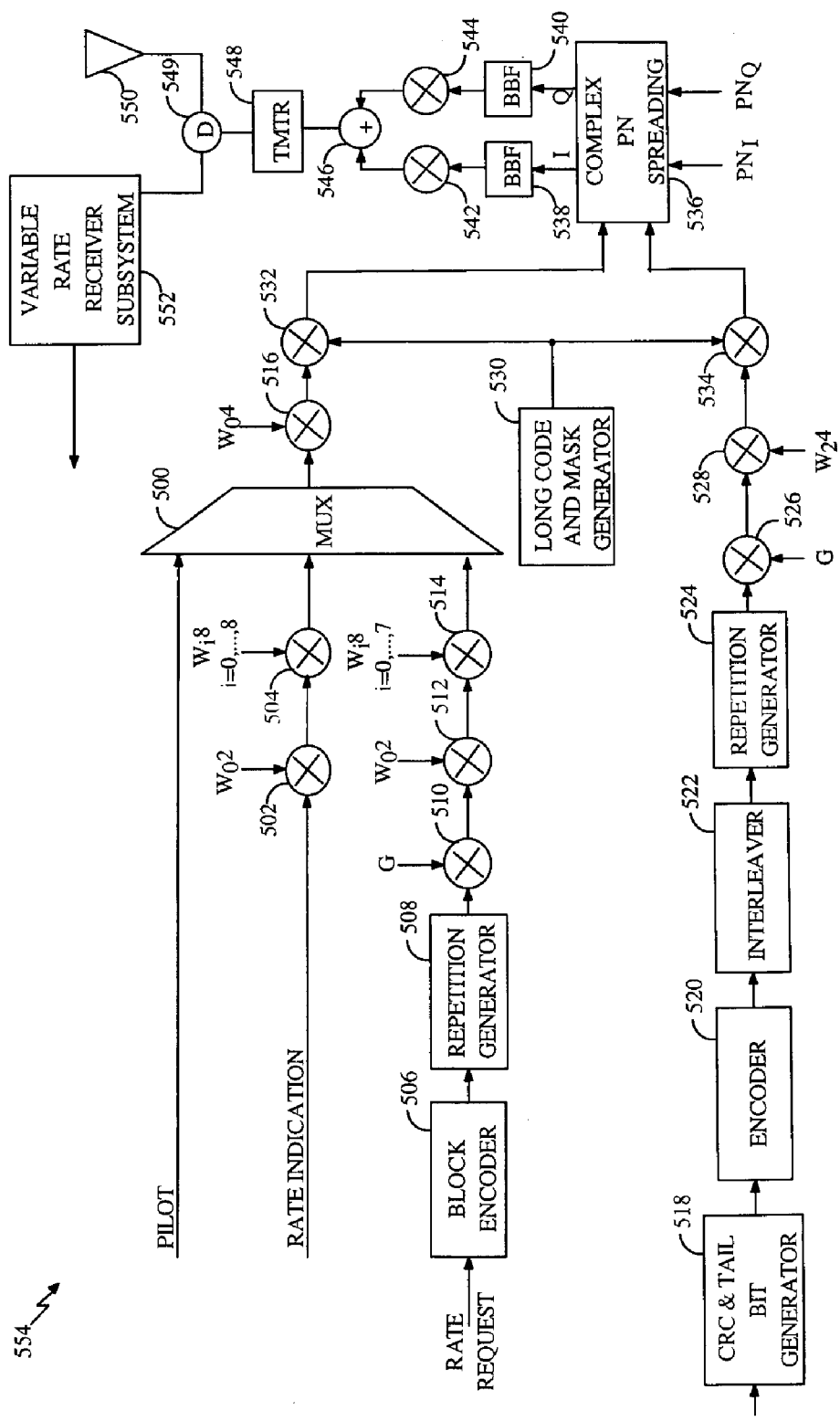

FIG. 10 illustrates an exemplary embodiment of the receiver for the third embodiment. The signal is received at antenna 600 and provided to receiver (RCVR) 602, which filters and amplifies the received signal. The received signal is then provided to downconverters 604 and 606, which downconvert the received signal in accordance with a QPSK downconversion methodology as is well known in the art. The I and Q components of the downconverted signals are provided to baseband filters (BBF) 608 and 610, which filter the signals and provide the baseband signals to complex PN despreading element 612. The implementation of complex PN despreading element 612, which removes the complex PN spreading, was described in equations 1 and 2. An implementation of complex PN despreading element 612 is described in detail in the aforementioned U.S. patent application Ser. No. 08/856,428, now abandoned.

The complex PN despread packets are provided to descramblers 614 and 618. The packets are descrambled in accordance with long PN codes generated by long code and mask generators 618 which generate the long code sequence as described above with respect to previous embodiments.

The descrambled data packets from descramblers 614 and 616 are provided to subchannel despreading elements 620, 622, 624 and 626, which remove the Walsh subchannel coverings from the received data stream. Subchannel despreading elements 620 and 622 remove the pilot subchannel covering from the descrambled data in accordance with the pilot subchannel Walsh sequence ($W_2^4$). Subchannel despreading elements 624 and 626 remove the data subchannel coverings from the descrambled data in accordance with the pilot subchannel Walsh sequence ($W_0^4$).

The output from subchannel despreaders elements 624 and 626 are provided to demultiplexer (De-Mux) 628. Demultiplexer 628 separates out the different portions of the received control channel corresponding to the pilot symbols, the rate indication symbols, and the data request symbols, and outputs that data to three separate outputs.

The pilot symbols provided by demultiplexer 628 onto a first output are provided to pilot filter 632 which performs a moving average filtering operation on the signal in order to reduce the effects of noise on the received pilot signal. The I and Q components from pilot filter 632 are provided to dot product circuit 630 which performs a coherent demodulation of the QPSK data channel. The design of dot product elements is well known in the art and is described in detail in U.S. Pat. No. 5,506,865, entitled "PILOT CARRIER DOT PRODUCT CIRCUIT," which is assigned to the assignee of the present invention and incorporated by reference herein.

The demodulated data signal out of dot product element 630 is provided to repetition combiner 638. Repetition combiner 638 combines the repeated symbols in the packet in accordance with the detected reverse link rate signal provided by rate indication decoder 634. The combined symbol energies are provided to deinterleaver 640 which reorders the symbols in accordance with the detected rate indication signal provided by rate indication decoder 634. The reordered symbols are provided to decoder 642 which decodes the symbols in accordance with the detected rate indication signal. In the exemplary embodiment, decoder 642 is a turbo decoder, the implementation of which is well known in the art and is described in detail in U.S. Pat. No. 5,446,747. The present invention is equally applicable to other decoder structures such as trellis decoders and block decoders.

Demultiplexer 628 provides the received symbol energies corresponding to the rate indication signal on a second output to rate indication decoder 634. Rate indication decoder 634 can be implemented in a variety of ways such as by using a bank of correlators to correlate the received symbol energies with the possible rate indication waveforms. The waveform that has the highest correlation energy would be detected as the transmitted waveform, thus determining the rate indication value. The rate indication value is provided to repetition combiner 638, deinterleaver 640 and decoder 642 to assist in the operation of those elements.

Demultiplexer 628 provides the received symbol energies corresponding to the rate request message signal on a third output to rate request (DRQ) decoder 636. Each base station in the active set of the remote station would attempt to decode the rate request message using an assigned Walsh sequence. Only the base station that the remote station desires to transmit the data will be able to correctly decode the rate request message. After the selected base station or sector removes the Walsh covering from the rate request message, the message is block decoded to provide the requested rate information to the base station. This information is provided to a control processor in the selected base stations or sector which schedules data transmissions to the remote station in accordance with this rate request.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein, but is to be accorded the widest scope consistent with the principles and novel features disclosed herein.

We claim:

1. A method for transmitting a variable rate data packet, comprising:

receiving said variable rate data packet;

encoding said variable rate data packet;

receiving a rate indication signal indicating a transmission rate of said variable rate packet;

encoding said rate indication signal in accordance with a predetermined set of encoding formats wherein the encoding formats are selected in accordance with a value of the rate indication signal;

receiving a rate request message;

encoding said rate request message; and receiving said encoded variable data rate packet;

covering said encoded variable rate packet in accordance with a first orthogonal covering format;

receiving said encoded rate indication signal; and covering said encoded rate indication signal in accordance with a second orthogonal covering format.

2. The method of claim 1 wherein said rate indication coding comprises:

selecting a Walsh sequence from a predetermined set of Walsh sequences in accordance with the transmission rate of said variable rate packet;

encoding said rate indication signal in accordance with said selected Walsh sequence.

3. The method of claim 1 further comprising:

encoding a set of pilot symbols to provide a pilot signal; and combining said encoded rate indication signal and said pilot signal.

4. The method of claim 3, further comprising:

combining said encoded rate request message with said pilot signal and said encoded rate indication signal.

5. A system for transmitting a variable rate data packet, comprising:

data coding means for receiving said variable rate data packet and for encoding said variable rate data packet;

rate indication coding means for receiving a rate indication signal indicating a transmission rate of said variable rate packet and for encoding said rate indication signal in accordance with a predetermined set of encoding formats wherein the encoding formats are selected in accordance with a value of said rate indication signal;

pilot coding means for encoding a set of pilot symbols to provide a pilot signal;

multiplexer means for combining said encoded rate indication signal and said pilot signal; and rate request coding means for receiving a rate request message, encoding said rate request message and providing said encoded rate request message to said multiplexer means, wherein said multiplexer means combines said encoded rate request message with said pilot signal and said rate indication signal.

6. The variable rate transmission system of claim 5, further comprising:

first orthogonal spreading means for receiving said encoded variable data rate packet and for spreading said encoded variable rate packet in accordance with a first orthogonal covering format; and second orthogonal spreading means for receiving said encoded rate indication signal and for spreading said encoded rate indication signal in accordance with a second orthogonal covering format.

7. The variable rate transmission system of claim 6, further comprising:

first scrambling means for receiving said orthogonal spread variable rate data packet and for scrambling said orthogonal spread variable rate data packet in accordance with a long code pseudonoise (PN) sequence; and second scrambling means for receiving said orthogonal spread rate indication signal and for scrambling said orthogonal spread rate indication signal in accordance with said long code pseudonoise sequence.

8. The variable rate transmission system of claim 7, further comprising:

complex PN spreading means for receiving said PN scrambled variable rate data packet and said PN scrambled rate indication signal and for performing a complex PN spreading upon said PN scrambled variable rate data packet and said PN scrambled rate indication signal in accordance with a combination of a first PN sequence and a second PN sequence.

9. A method for transmitting a variable rate data packet, comprising:

receiving said variable rate data packet;

encoding said variable rate data packet;

receiving a rate indication signal indicating a transmission rate of said variable rate packet;

encoding said rate indication signal in accordance with a predetermined set of encoding formats wherein the encoding formats are selected in accordance with a value of the rate indication signal;

encoding a set of pilot symbols to provide a pilot signal;

combining said encoded rate indication signal and said pilot signal;

receiving a rate request message and encoding said message; and combining said encoded rate request message with said pilot signal and said encoded rate indication signal.

10. The method of claim 9, wherein said rate indication coding comprises:

selecting a Walsh sequence from a predetermined set of Walsh sequences in accordance with the transmission rate of said variable rate packet; and encoding said rate indication signal in accordance with said selected Walsh sequence.

11. The method of claim 9, further comprising:

receiving said encoded variable data rate packet;

spreading said encoded variable rate packet in accordance with a first orthogonal covering format;

receiving said encoded rate indication signal; and spreading said encoded rate indication signal in accordance with a second orthogonal covering format.

12. The method of claim 11, further comprising:

receiving said orthogonal spread variable rate data packet;

scrambling said orthogonal spread variable rate data packet in accordance with a long code pseudonoise (PN) sequence; and receiving said orthogonal spread rate indication signal; and scrambling said orthogonal spread rate indication signal in accordance with said long code pseudonoise sequence.

13. The method of claim 12, further comprising:

receiving said PN scrambled variable rate data packet and said PN scrambled rate indication signal; and performing a complex PN spreading upon said PN scrambled variable rate data packet and said PN scrambled rate indication signal in accordance with a combination of a first PN sequence and a second PN sequence.

* * * * *

UNITED STATES PATENT AND TRADEMARK OFFICE
CERTIFICATE OF CORRECTION

PATENT NO.     : 6,798,736 B1
DATED          : September 28, 2004
INVENTOR(S)    : Black et al.

It is certified that error appears in the above-identified patent and that said Letters Patent is hereby corrected as shown below:

Drawings,
FIG. 6, box 322, please change "COMPLEX PN DESPREADING" to -- COMPLEX PN SPREADING --.
FIG. 9, box 536, please change "COMPLEX PN DESPREADING" to -- COMPLEX PN SPREADING --.

Column 2,
Line 43, after "variable" insert -- rate --.
Line 48, after "outgoing" delete "pilot".
Line 50, change "the" to -- a --.

Column 3,
Line 51, after "rate" insert -- R --.
Line 51, after "packet" delete "R".

Column 4,
Line 3, change "PN" to -- long code --.

Column 9,
Line 18, after "Thus," delete "by".
Line 46, change "spreading" insert -- scrambling --.

Column 10,
Line 13, after "provided" insert -- to --.

Column 12,
Line 45, change "stations" to -- station's --.

UNITED STATES PATENT AND TRADEMARK OFFICE
CERTIFICATE OF CORRECTION

PATENT NO.      : 6,798,736 B1
DATED           : September 28, 2004
INVENTOR(S)     : Black et al.

It is certified that error appears in the above-identified patent and that said Letters Patent is hereby corrected as shown below:

<u>Column 13,</u>
Line 58, change "618" to -- 616 --.

Signed and Sealed this

Twenty-eighth Day of December, 2004

JON W. DUDAS
*Director of the United States Patent and Trademark Office*